3,329,580
MICROBIOLOGICAL EXPLORATION FOR PETROLEUM DEPOSITS
Ralph J. De Falco, Somerville, N.J., and Andre R. Brillaud, West Chester, Pa., assignors to Sun Oil Company, Philadelphia, Pa., a corporation of New Jersey
No Drawing. Filed Apr. 18, 1966, Ser. No. 543,071
16 Claims. (Cl. 195—103.5)

ABSTRACT OF THE DISCLOSURE

Biological prospecting for petroleum by collecting soil samples, contacting each sample with a wash liquid capable of extracting a water soluble antigenic material characteristic of a selected hydrocarbon-consuming microorganism, and serologically testing separated wash liquid to detect such soluble antigenic material if present.

---

This application is a continuation-in-part of Ser. No. 357,290, filed Apr. 3, 1964 and now abandoned.

This invention relates to a biological method for prospecting for subterranean petroleum deposits which involves the use of serological techniques to obtain indicia as to the proximity of an underground petroleum reservoir.

Methods of prospecting for petroleum have been proposed heretofore wherein samples of earth from selected sites have been analyzed in various ways to indicate whether hydrocarbons or products resulting from bacterial decomposition of hydrocarbons are present. It has been postulated that hydrocarbon gases migrate through the earth from subterranean petroleum reservoirs and hence are present in the earth near the surface in the vicinity of petroleum deposits. It has proved difficult, however, to make reliable determinations of hydrocarbon content of soil samples due to the minute amount that may be present.

In soil subject to emanation of hydrocarbons from a petroleum deposit, microorganisms are generally present which consume or feed upon the hydrocarbon material. Accordingly it has been proposed to subject soil samples in the laboratory to an atmosphere containing a hydrocarbon gas, e.g., ethane, under growth conditions to allow the hydrocarbon-consuming microorganisms to multiply if any are present, and thereafter determine the extent of growth or the rate of consumption of the hydrocarbon. These values have been taken as indicia of the proximity of petroleum deposits with respect to the sampling location. Such procedures, however, are tedious and time-consuming, and the progress that can be made in running a prospecting survey over a wide area by such methods is slow at best.

More recently an improved method for the microbiological prospecting for petroleum deposits has been described in Douros and Raymond United States Patent No. 3,065,149. This method avoids the laborious procedure heretofore proposed of growing microorganisms present in selected soil samples in a gaseous hydrocarbon atmosphere and determining the rate of proliferation. Instead the soil samples are tested by serological procedures to determine the presence or absence of a selected microorganism capable of consuming gaseous petroleum hydrocarbons. More specifically, the method involves preparing an antiserum by injection of the microorganism, grown as a culture under laboratory conditions, into an appropriate animal such as a rabbit, allowing the animal to develop antibodies specific to the microorganism in its bloodstream and subsequently recovering the antiserum from the animal's blood. A soil sample for test is incubated for at least one hour with a portion of the antiserum, whereby reaction between the microorganism and the antiserum will occur if the microorganism is present in the soil sample. The treated soil sample is separated from the incubated antiserum and the latter is then serologically tested by admixing it with microorganism from the culture and visually observing whether or not a reaction occurs. The absence of a visible reaction is taken to indicate that no antibodies remained and hence that the microorganism was present in the soil sample and had neutralized the antibodies. On the other hand, if agglutination occurs due to reaction between the incubated antiserum and the microorganism, absence of the microorganism in the soil sample is indicated. By carrying out the test employing controlled quantities and dilutions of soil sample, antiserum and microorganism from the culture, it is possible to obtain quantitative information as to the concentration of the selected microorganism in the soil.

While the method of the foregoing patent offers distinct advantages over other microbiological prospecting methods, the procedure utilized in practicing the method is not sufficiently foolproof to insure complete reliability in all cases. The direct contacting of the antiserum with the soil material, as required therein, gives rise to possibilities of erroneous results. In some instances sorption of the antiserum by the soil may occur even though the specific microorganism in question is not present. In other instances it is possible to obtain a false appearance of agglutination indicating that the microorganism was not present in the soil sample whereas the soil actually contained it in substantial concentration. Another difficulty that may be experienced can result from failure to visually observe any reaction between the incubated antiserum and the microorganism although such reaction may actually occur, thus leading to the conclusion that the soil sample contained the microorganism in question when in fact it did not. In other words, the testing procedure does not consistently provide the certainty that is desirable for a biological prospecting method. Furthermore the procedure generally necessitates the use of antiserum of low dilution, i.e., relatively high concentration. This is disadvantageous in that at low dilutions the normally occurring agglutinins found in all animal sera may confuse the picture by giving a non-specific cross reaction.

The present invention provides an improved serological method for the biological prospecting for petroleum which is more reliable than and offers distinct advantages over the method described in the above-discussed patent. The present method not only obviates the possibility of getting false indications of the presence or absence of a selected hydrocarbon consuming microorganism in soil samples but it also minimizes the amount of antiserum required in making the test. The method can, if desired, be carried out in a quantitative manner to show the concentrations of a particular hydrocarbon-consuming microorganism in collected soil samples. The method can be carried out more rapidly than the serological method heretofore proposed and with a considerably higher degree of reliability.

It has now been discovered that certain types of solvents or wash liquids, as hereinafter specified, are capable of extracting from soil samples containing a hydrocarbon-consuming microorganism a material, presumed to be a metabolite, which is an antigen or partial antigen and which is capable of specific reaction with antiserum prepared by utilizing the same microorganism. Hence reaction with the whole cells is not required, and the contacting and incubation of the soil sample itself with the antiserum can be avoided. Instead the soil sample is first contacted or washed with a small amount of solvent, and the soil is then separated from the solvent or wash liquid and may be discarded. The separated wash liquid can then be tested for serological reaction with the antiserum by any suitable immunological procedure to show the presence or absence of the microorganism in question in the soil sample tested.

The results of serological tests made with wash liquid, rather than with the soil sample itself as done in the prior art procedure, serve more reliably as indicia of the proximity of petroleum deposits to the sites of collecting the soil samples. Testing of the wash liquid only against the antiserum rather than of the soil itself is distinctly advantageous. By eliminating any contact between the antiserium and the soil, the possibility of antibody sorption not due to the presence of the microorganism is avoided and more reliable results are obtained.

The solvents or wash liquids used for extracting soil samples in practicing the present invention comprise water, water-miscible organic solvents of certain types, and aqueous mixtures of such solvents. In the case of water, either distilled water or saline water can be used but the salt content in the latter case preferably does not exceed 1%. The organic solvents that can be used are completely miscible with water at room temperature, are all oxygen-containing and have not more than six total carbon atoms per molecule. More particularly, these solvents are of the types which are listed below along with representative examples thereof:

(1) Cyclic mono- and diethers, e.g., tetrahydrofuran, tetrahydropyran, dioxane (meta or para).
(2) Glycols, e.g., ethylene glycol, propylene glycol (1,2 or 1,3).
(3) Glycol-ethers, e.g., the mono- and dimethyl ethers of ethylene glycol, the mono- and diethyl ethers of ethylene glycol, the mono- and dimethyl ethers of diethylene glycol, and diethylene glycol monoethyl ether.
(4) Alcohols, e.g., methanol, ethanol, isopropanol.
(5) Lactones, e.g., propiolactone, buterolactone.
(6) Acetone.

All of the kinds of wash liquids described above, which are completely miscible with water and have not more than six carbon atoms, when contacted with a soil sample containing a hydrocarbon-consuming microorganism will extract therefrom antigenic or partial antigenic material characteristic of that particular microorganism. Consequently extraction of the soil in this manner will give an extract which can then be tested against the antiserum in the absence of the soil, thus avoiding the potential disadvantages of contacting the antiserum with the soil itself. Particularly good results can be obtained when dioxane is employed and hence this is the preferred solvent for extracting the soil samples.

In order to determine whether the wash liquid separated from the soil contains extracted material indicative of the presence in the soil of the microorganism in question, any of several serological techniques of testing the extract are suitable. These include techniques classifiable as follows:

(1) Agglutination
(2) Agglutination inhibition
(3) Agar gel diffusion-precipitin
(4) Agar gel diffusion-precipitin inhibition
(5) As per (3) but including electrophoresis
(6) As per (4) but including electrophoresis Other known immunological procedures also can be used. In employing any of these techniques it is desirable, whenever one of the above-described organic solvents has been used for extracting the soil, to dilute the extract solution with water prior to reacting the antigenic material with antiserum. The solution should be diluted with water in amount such that no non-specific reaction between the solvent and the antiserum will occur. As a general rule sufficient aqueous dilution should be done to reduce the organic solvent content of the test mixture to less than 20% by weight, more preferably less than 10%, e.g., 2–5%.

The immunological procedures referred to above are known techniques are are described in various texts, e.g., Zinsser's Microbiology, 12th ed. (1960), by Smith and Conant, pages 142–157; Annual Review of Microbiology, vol. 14 (1960), chapter on "Interpretation of Immunodiffusion Tests" at pages 161–176; and Methods of Biochemical Analysis, vol. 7 (1959), chapter on "Immunoelectrophoretic Analysis" at pages 2–38.

In general these procedures either involve testing of the wash liquid extract for direct reaction with antiserum under conditions that will show agglutination or precipitation, or else they involve first mixing the wash liquid extract with antiserum and thereafter testing the mixture against antigen derived from the microorganism to determine whether or not reaction of the antiserum has been inhibited. By employing predetermined standardized amounts of soil, wash liquid, antiserum and antigen and utilizing a series of dilutions, quantitative indications of the concentration of the selected microorganism in the soil can be obtained.

The procedure permits biological surveys to be carried out rapidly over wide areas. It can be employed to obtain quantitative results that can be plotted on a map of the area surveyed to reveal zones having an anomalously high concentration of the selected microorganism. Abnormally high concentrations may be indicative of the proximity of a petroleum deposit. By interpreting these results in conjunction with geological, seismographic and other types of information utilized in petroleum prospecting, an increase in the probability of locating petroleum deposits can be achieved.

The invention can be practiced utilizing any microorganism capable of consuming gaseous petroleum hydrocarbons which is apt to be present in soils containing such hydrocarbons. Various microorganisms are known that utilize hydrocarbons as a carbon source, including species within the genera of mycobacteria, nocardiae, streptomycetes, agrobacteria, bacilli, methamonas and filamentous fugi. The serological procedure can be carried out using any such species or any other microorganism that occurs in nature and can propagate due to an ability to feed upon gaseous hydrocarbons emanating from petroleum sources. However, it is distinctly preferable to employ *Mycobacterium paraffinicum,* as this organism has been shown to be particularly prevalent in areas where petroleum hydrocarbons occur (Davis et al., Applied Microbiology, vol. 7, No. 3, May 1959, pages 156–165). Furthermore it has been shown that this microorganism, while being capable of consuming ethane and higher paraffins, will not consume methane and hence cannot be present in soils where methane is the only hydrocarbon that occurs. This characteristics of *Mycobacterium paraffinicum* is advantageous in view of the fact that methane is produced by vegetive decomposition and occurs widely in nature without being associated with petroleum. By selecting this particular organism for practicing the invention, erroneous results that could otherwise be obtained due to the presence of vegetative methane in soils are obviated. While the cells of *Mycobacterium paraffinicum* are coated with a waxy substance that could cause difficulty if whole cells are used in the serological tests, this can be avoided as discussed below.

For purpose of more specific illustration the invention will be described utilizing agglutination inhibition (No. 2 supra) as the immunological test procedure. In this procedure a mixture of the soil wash liquid and antiserum is tested for agglutination against an antigen-containing reagent which is used instead of whole cells of the selected microorganism. This reagent comprises antigen material derived from the cells and bonded to a finely divided carrier which itself is inert to the antiserum. The use of carriers for this purpose is described in United States Patents Nos. 3,088,875 and 3,096,250. These carrier-supported antigen reagents will readily undergo agglutination with antibodies of the antiserum to give an agglutinate which is easily detected visually due to the relatively large size of agglutinate particles formed. The use of this kind of reagent is advantageous in avoiding the possibility of obtaining a false semblance of agglutination when no agglutination reaction has actually occurred, as can happen when whole cells of the microorganism are used instead of such reagent. Errors of this character can arise especially when the selected microorganism is of a type that has a non-antigenic waxy coating on the periphery of the cells, as is the case with *Mycobacterium paraffinicum* as mentioned above. This waxy coating may cause cells to agglomerate with each other during the test and give a false appearance of an agglutination reaction, thus leading to the erroneous interpretation that the microorganism was not present in the soil sample tested when in fact it was. Use of the carrier-supported antigen reagent in the agglutination inhibition test avoids such errors.

Preparatory to prospecting for petroleum by the method of the present invention a culture of the selected hydrocarbon-consuming microorganism is first prepared. This can be done by isolating the microorganism from a hydrocarbon-containing soil sample and growing a pure culture thereof on a suitable culture medium such as mineral salts-agar in the presence of ethane. Alternatively the microorganism can be grown in a mineral salt solution in a dialysis bag immersed in a mineral salt solution and supplied with ethane. The latter procedure eliminates some of the metabolite formed during growth by diffusion through the bag membrane. The whole cells obtained by either procedure, somatic antigen derived therefrom or proteinaceous metabolite formed during propagation of the microorganism can be used as the source of antigen needed for producing both the antiserum and the carrier-supported antigen employed in accordance with the invention. Preferably both the antiserum and the carrier-supported antigen reagent are prepared by using somatic antigen material extracted from the cells.

In preparing the antiserum by inoculation of suitable animals such as rabbit, goat, monkey, horse, hamster or chicken, one procedure involves injection into the animal of whole cells which have been rendered avirulent such as by heat killing, formalizing, phenolizing or attenuation. However it is often preferable to separate from the whole cells somatic antigen material or a selected fraction thereof and to utilize the separated antigen for inoculation of the animals. This is particularly true in the case of *Mycobacterium paraffinicium* since the waxy non-antigenic coating on the cell surfaces may retard the formation of antibodies in the animal's bloodstream. The somatic antigen can be extracted from the cells by preparing a suspension of the latter in normal saline water (1% NaCl) and then alternately freezing and thawing the suspension to disintegrate the cells. Alternatively the cells can be disintegrated by subjecting the suspension to ultrasonic vibrations. After the cells have been disrupted, the mixture is centrifuged to separate undissolved cellular material and the clear supernatant liquid containing the antigenic proteinaceous material is drawn off. If desired this material can be fractionated to obtain selected antigen fractions for use in producing both the antiserum and the carrier-supported antigen reagent. Fractionation of the antigenic material can be advantageous inasmuch as certain fractions may be more specific to the particular microorganism selected. One suitable procedure for effecting the fractionation involves successively freezing and partially thawing the aqueous antigen solution and separately collecting successive thaw fractions. In some cases one or more of the fractions, when injected into an animal, may cause the production of antibodies that are fully specific for the selected microorganism, whereas other fractions or the entire somatic antigen material may produce some antibodies capable of cross-reaction not only with the selected microorganism but also with other microorganisms associated therewith in the soil. Fractionation of the somatic antigen material thus may increase the specificity of the procedure.

In place of using somatic antigen material in the preparation of antiserum, proteinaceous metabolite formed during cell growth or fractions thereof obtained by the above-described freeze-thaw technique can be employed.

For inoculation of the animals, antigen from the microorganism, being either whole cells or any selected portion of antigen material produced by the microorganism, preferably is used in admixture with a suitable adjuvant such as Freund's adjuvant (see Topley and Wilson's Principles of Bacteriology and Immunology, 4th Edition, Vol. II, page 1271). For example one part of somatic antigen solution obtained from cells by the freeze-thow technique is emulsified with an equal part of Freund's adjuvant and the emulsified material is then injected intra-muscularly via the thigh muscle into rabbits in 0.5 ml. quantities once a week for three weeks. On the fourth week two injections of the antigen solution alone are given subcutaneously. Following these injections best antiserum titer generally will result by the seventh day after the last injection. If desired still further increase in the antibody content of the blood serum generally can be obtained by intravenous injections. When this is done 0.25–0.50 ml. portions of the antigen solution are given on three successive days and the serum is obtained from the blood on the sixth day after the last injection.

Obtaining the antiserum from the inoculated animal involves merely withdrawing a quantity of blood, allowing the blood to clot and separating the clear serum.

In preparing the carrier-supported antigen reagent, the antigen can be the whole somatic antigen material derived from the microbial cells or a selected fraction thereof or it can be non-somatic protein produced by the microorganism. The carrier can be any finely divided material which is inert to the antiserum and which is capable of bonding the antigen to its surface. The size of the carrier particles should be sufficiently small so that they will be capable of forming a relatively stable suspension in water. As a general rule the particle size of the carrier should correspond to particle diameters in the range of 0.1–20 microns, more preferably 0.5–10 microns, and it is most preferable that the particles be of relatively uniform size. Examples of suitable carrier materials are latex, formalized or tanned red blood cells of swine, rabbits or other animals, *Escherichia coli* or other microbial cells stained with methylene blue, and various resins in finely divided form.

Preparation of the carrier-supported reagent involves admixing a dispersion of the carrier in a saline solution with a suitable amount of antigen derived from the microorganism and allowing the mixture to react for a time. As previously indicated this antigen material can be the whole somatic antigen derived from the microorganism, but it often is advantageous to use a selected fraction thereof such as a fraction obtained by employing the freeze-thaw technique or by dialysis. Apparently a chemical reaction occurs when the carrier dispersion and antigen solution are mixed, which causes the antigen to become bonded to the surface of the carrier particles, as the antigen cannot thereafter be washed from the particles. Iu any event the antigen present on the carrier particles is capable of reacting with antibodies when admixed with the antiserum and the antibody molecules will function as links that tie the coated carrier particles to each other. This results in an agglutination that can readily be seen when proper dilutions of the antiserum and/or carrier-supported antigen are used. The agglutination can be observed at considerably higher titers (i.e., lower antibody or antigen concentrations) than are operable in the absence of the carrier material.

Carrier materials which are particularly suitable for preparing the supported antigen reagents are formalized or tanned red blood cells and latex emulsions. In preparing the former, blood of goats or rabbits, for example, is collected in the presence of citrate buffer to prevent clotting and a 2% formaldehyde or 0.02% tannic acid solution is added and allowed to react overnight or until a brown color has developed. The mixture is then centrifuged and the supernatant liquid is removed. The treated erythrocytes or red blood cells are mixed with normal saline solution, the mixture is separated by centrifugation and the treated cells are then made up in normal saline solution as a 4–20% dispersion by volume. Generally the cell concentration employed for the dispersion will depend upon the particular kind of animal from which the erythrocytes were obtained. For example, for goat red blood cells 12–20% dispersions usually should be used, while for rabbit red blood cells lower concentrations give better results. The supported antigen reagent for use in practicing the invention is prepared by mixing the dispersion with antigen derived from the selected microorganism. The antigen becomes bonded to the surfaces of the treated cells evidently by chemical reaction. Reagent made in this manner is especially satisfactory in that it has high sensitivity for reaction with the antiserum and need not be kept under refrigeration.

Preparation of the antigen reagent from latex merely involves admixing a latex emulsion of suitable concentration with the antigen. Latex emulsions, such as polystyrene latex, are available commercially, typically having a latex content in the range of 2–30% by volume. These can be used as a source of the carrier and should be diluted preferably to about 1% latex content prior to addition of the antigen. Again upon adding the antigen a chemical reaction apparently occurs which bonds the antigen to the latex particle surfaces. Reagent prepared in this manner if kept for an extended time should be maintained under refrigeration.

The following examples illustrate procedures involved in practicing the invention:

Example I

A culture of *Mycobacterium paraffinicum*, which organism had been isolated from an oil field soil sample, was grown in the laboratory and an aqueous solution of its somatic antigen material was prepared employing the freeze-thaw procedure for disrupting the cells. A latex-supported antigen reagent was prepared by admixing 1.0 ml. of the aqueous antigen solution with a commercial latex which was a 1% by volume aqueous dispersion of polystyrene having a particle size of about 0.8 micron. The mixture was allowed to react at room temperature for 30 minutes and then was kept under refrigeration until use. An antiserum was also prepared by inoculating rabbits with the aqueous antigen solution by the procedure hereinbefore described and thereafter separating the antiserum from the blood. In one set of tests the antiserum in a series of dilutions in normal saline solution was admixed with a selected amount of the latex-supported antigen reagent to determine at what dilutions agglutination could be observed. In a comparative set of tests the antiserum in the same series of dilutions in normal saline was first admixed with a selected amount of antigen solution and the mixture was thereafter mixed with the latex-support antigen reagent. Observations regarding agglutination are shown in Table I wherein the degree of agglutination in each test is indicated by the number of plus signs.

TABLE I

| Dilution of Antiserum | Agglutination of Latex Reagent with Antiserum | Agglutination of Latex Reagent with Antiserum-Antigen Mixture |
| --- | --- | --- |
| 1:1 | | |
| 1:2 | | |
| 1:50 | | |
| 1:100 | ± | |
| 1:200 | + | |
| 1:300 | ++++ | |
| 1:500 | ++++ | |
| 1:1000 | ++++ | |
| 1:2000 | ++++ | |
| 1:4000 | ++++ | |
| 1:8000 | ++++ | |
| 1:10,000 | ++++ | |
| 1:12,000 | ++ | |
| 1:16,000 | | |

The results in Table I show that a heavy agglutination occurred between the latex reagent and the antiserum at dilutions from 1:300 to 1:10,000, while the antiserum which had previously been mixed with antigen gave no evidence of agglutination at any dilution. The titer of the antiserum is shown by the data to be about 1:10,000. It is to be noted that the antiserum at low dilution, i.e., high concentration, fails to exhibit any agglutination with the latex reagent. This is known as the "prozone" phenomenon (Topley and Wilson's text, vol. I, pages 244–245). It is due to the large excess of antibody relative to carrier-supported antigen available for cross reaction. Flocculation depends upon the multivalent antibody molecules reacting with two or more antigen molecules carried on different support particles, thus linking a plurality of the particles together as a lattice which is large enough to be observed. However, when a large excess of the antibody is present, it will react with the antigen essentially at only one of its valence sites and linking between the particles cannot take place to form visible floc. Hence the prozone phenomenon occurs.

The data in Table I show that, in practicing the invention, proper dilutions must be used to avoid the prozone effect while not exceeding the titer of the antiserum. The results also show that the present procedure permits the use of antiserum in high dilution and hence minimizes the amount of antiserum that needs to be made by animal inoculation. By way of comparison, when antiserum was mixed with whole cells of *Mycobacterium paraffinicum* in place of carrier-supported antigen derived from the cells, the maximum antiserum titer that could be obtained was 1:256 as compared to 1:10,000 shown in the foregoing example.

Example II

Somatic antigen was obtained from *Mycobacterium paraffinicum* by subjecting a normal saline suspension of the microorganism cells to ultrasonic vibrations to disrupt the cells and then centrifuging to remove the cellular material. The antigen extract was used to prepare a supported antigen reagent in which the carrier material was tanned swine erythrocytes. The latter was prepared first by mixing equal parts of a 4% saline suspension of washed pig red blood cells and an 0.02% tannic acid solution, allowing the mixture to react for 30 minutes and then separating and washing the treated cells with saline solution employing centrifugation. The antigen extract was then mixed with a suspension of the cells thus causing sorption of the antigen on the cell surfaces, following which the cells were washed twice in saline solution by centrifugation and then were suspended in a proportion of 18% by volume in saline solution. This suspension constituted the carrier-supported antigen reagent.

Other portions of the antigen extract were used to prepare antisera by inoculating both rabbits and goats approximately in the manner previously described above. The resulting antisera from both types of animals when admixed at a dilution of 1:3000 with the carrier-supported antigen reagent caused agglutination to occur.

A batch of soil was obtained from an area not subject to substantial contamination by hydrocarbons and was separated into two portions. One portion (Soil A) was inoculated with *Mycobacterium paraffinicum* while the other (Soil B) was not, and each portion was maintained in an atmosphere comprising air containing a minor proportion of ethane for a period of one month. A small sample (0.2 g.) of each soil portion was shaken with water (4 ml.) as the wash liquid and the water was then separated from the soil by decantation.

When the wash waters thus obtained were added to either the rabbit or goat antiserum (dilution 1:3000) and the resulting blends were then admixed with the carrier-supported antigen reagent, agglutination occurred only in the case of the water that had contacted the soil which had not been inoculated with *Mycobacterium paraffinicum* (Soil B). The water that had contacted the soil (Soil A) in which the microorganism had grown showed no reaction with the antigen reagent. This shows that water will function as a suitable solvent for extracting from soil antigenic or partial antigenic material characteristic of the selected microorganism.

The foregoing results are illustrated in Table II, again using plus signs to indicate agglutination.

TABLE II

| Soil Used | Type of Antiserum | Antigen Reagent with Antiserum | Antigen Reagent with Wash Water plus Antiserum |
|---|---|---|---|
| Soil A* | Rabbit | ++++ | |
|  | Goat | ++++ | |
| Soil B | Rabbit | ++++ | ++++ |
|  | Goat | ++++ | ++++ |

*Contained *Mycobacterium parafinicum*.

The tabulated results show that the procedure of the present invention is readily capable of distinguishing between soils that contain and those that do not contain the selected microorganism. By running the test employing a series of dilutions with controlled quantities of soil samples, antisera and antigen reagents, quantitative information as to the relative abundance of the selected microorganism in soil samples can be secured.

*Example III*

A batch of soil taken over a known oil field was used in four comparative tests made with different wash liquids. This soil was shown by bacteriological plating techniques and microscopic examination to contain *Mycobacterium paraffinicum*. The serological procedure used in these tests was agar gel diffusion-precipitin (No. 3 supra), utilizing rabbit antiserum prepared as previously described. The procedure involved preparing an agar layer with a small central well and four small surrounding wells, placing antiserum in the central well and the wash extracts separately in the outlying wells, allowing diffusion through the agar to occur and thereafter observing the heaviness of precipitation at the zones where reaction occurred. Each wash extract was obtained by contacting 50 g. of the soil with 100 ml. of wash liquid and then decanting. Only small amounts of the wash extract and the antiserum were required to fill the wells in the agar. The four wash liquids used were: distilled water; 0.2% NaCl in water; 2.5% NaCl in water; and dioxane. In all the tests precipitation occurred, thus positively indicating the presence of *Mycobacterium paraffinicum* in the soil. The heaviness of precipitation, as estimated from observation of the lines formed in the agar, is indicated in Table III by the number of plus signs.

TABLE III

| Wash liquid: | Degree of precipitation |
|---|---|
| Distilled water | ++ |
| 0.2% saline | ++ |
| 2.5% saline | + |
| Dioxane (para) | +++++ |

These results indicate that the use of dioxane as the wash liquid provides particularly good sensitivity for detecting the presence of the microorganism. The results also indicate that water and saline solutions are operative but that increasing salt concentration tends to give poorer results.

Other solvents as herein specified can be used in place of water or dioxane in the preceding example and positive results will likewise be obtained. Mixtures of the various solvents, of course, can be employed if desired.

Serological testing of soil samples according to the present invention is a relatively simple procedure that can be carried out readily in the field as the soil samples are collected. A field kit provided with a supply of the carrier-supported antigen reagent and antiserum conveniently can be used. One typical procedure for rapidly testing collected soil samples for the presence or absence of a particular microorganism is as follows. A small amount (e.g., 0.5 g.) of soil sample is mixed with 5 ml. of distilled water, dioxane or other suitable solvent and the mixture is allowed to settle. Supernatant liquid is withdrawn and 1 ml. thereof is mixed with 1 ml. of antiserum which preferably has been diluted to a concentration about three times greater than that corresponding to its titer. A drop of the mixture is placed on a glass plate, a drop of the carrier-supported antigen reagent is added to it and observations are made for agglutination. If the soil contained the microorganism in question the water wash will contain antigen derived therefrom and the antigen even in small amount will inhibit agglutination. The occurrence or non-occurrence of agglutination indicates, respectively, the absence or presence in the soil sample of the microorganism.

We claim:
1. Method of biological prospecting for petroleum deposits which comprises:
 (a) collecting a soil sample from a selected location;
 (b) contacting the soil sample with a wash liquid essentially comprising a water-miscible organic solvent having not more than six carbon atoms per molecule selected from the group consisting of cyclic mono- and diethers, glycols, glycol-ethers, alcohols, lactones and acetone;
 (c) separating wash liquid from the soil;
 (d) testing the separated wash liquid for serological reaction with an antiserum, said antiserum having been prepared by inoculating an animal with antigen of a selected microorganism of a type capable of consuming gaseous petroleum hydrocarbon to form antibodies in the animal's bloodstream and separating the antiserum from the blood;
 (e) and utilizing the test results to show the occurrence of said microorganism in the soil as indicia of the proximity of said selected location to a petroleum deposit.
2. Method according to claim 1 wherein the selected microorganism is *Mycobacterium paraffinicum*.
3. Method according to claim 2 wherein said wash liquid is dioxane.
4. Method according to claim 2 wherein said organic solvent is a cyclic ether.
5. Method according to claim 1 wherein said wash liquid is dioxane.
6. Method according to claim 1 wherein said organic solvent is a cyclic ether.
7. Method of biological prospecting for petroleum deposits which comprises:
 (a) collecting a soil sample from a selected location;

(b) contacting the soil sample with a wash liquid selected from the following: (1) water, (2) water-miscible organic solvents having not more than six carbon atoms per molecule selected from the group consisting of cyclic mono- and diethers, glycols, glycol-ethers, alcohols, lactones and acetone, and (3) mixtures thereof;

(c) separating wash liquid from the soil;

(d) testing the separated wash liquid for serological reaction with an antiserum, said antiserum having been prepared by inoculating an animal with antigen of a selected micro-organism of a type capable of consuming gaseous petroleum hydrocarbon to form antibodies in the animal's bloodstream and separating the antiserum from the blood, said testing being in a manner to detect serological reaction of the antiserum only with soluble antigenic material dissolved from the soil by the wash liquid;

(e) and utilizing the test results to show the occurrence of said microorganism in the soil as indicia of the proximity of said selected location to a petroleum deposit.

8. Method according to claim 7 wherein said testing involves diffusion of the wash liquid through a gel for contact with said antiserum.

9. Method according to claim 8 wherein said wash liquid essentially comprises a water-miscible organic solvent of the class specified.

10. Method according to claim 9 wherein said organic solvent is dioxane.

11. Method according to claim 10 wherein the selected microorganism is *Mycobacterium paraffinicum*.

12. Method according to claim 9 wherein the selected microorganism is *Mycobacterium paraffinicum*.

13. Method according to claim 8 wherein the selected microorganism is *Mycobacterium paraffinicum*.

14. Method according to claim 7 wherein said wash liquid essentially comprises a water-miscible organic solvent of the class specified.

15. Method according to claim 14 wherein the selected microorganism is *Mycobacterium paraffinicum*.

16. Method according to claim 15 wherein said organic solvent is dioxane.

References Cited
UNITED STATES PATENTS

| | | | |
|---|---|---|---|
| 2,330,026 | 8/1943 | Blou | 195—103.5 |
| 3,065,149 | 11/1962 | Douros | 195—103.5 |
| 3,096,254 | 7/1963 | Hitzman | 195—103.5 |

A. LOUIS MONACELL, *Primary Examiner.*

ALVIN E. TANENHOLTZ, *Examiner.*